INVENTORS
Klaus Weindel
Josef Müller
Dieter Wanner
BY Bailey, Stephens and Huettig
ATTORNEYS INVENTORS
Klaus Weindel
Josef Müller
Dieter Wanner

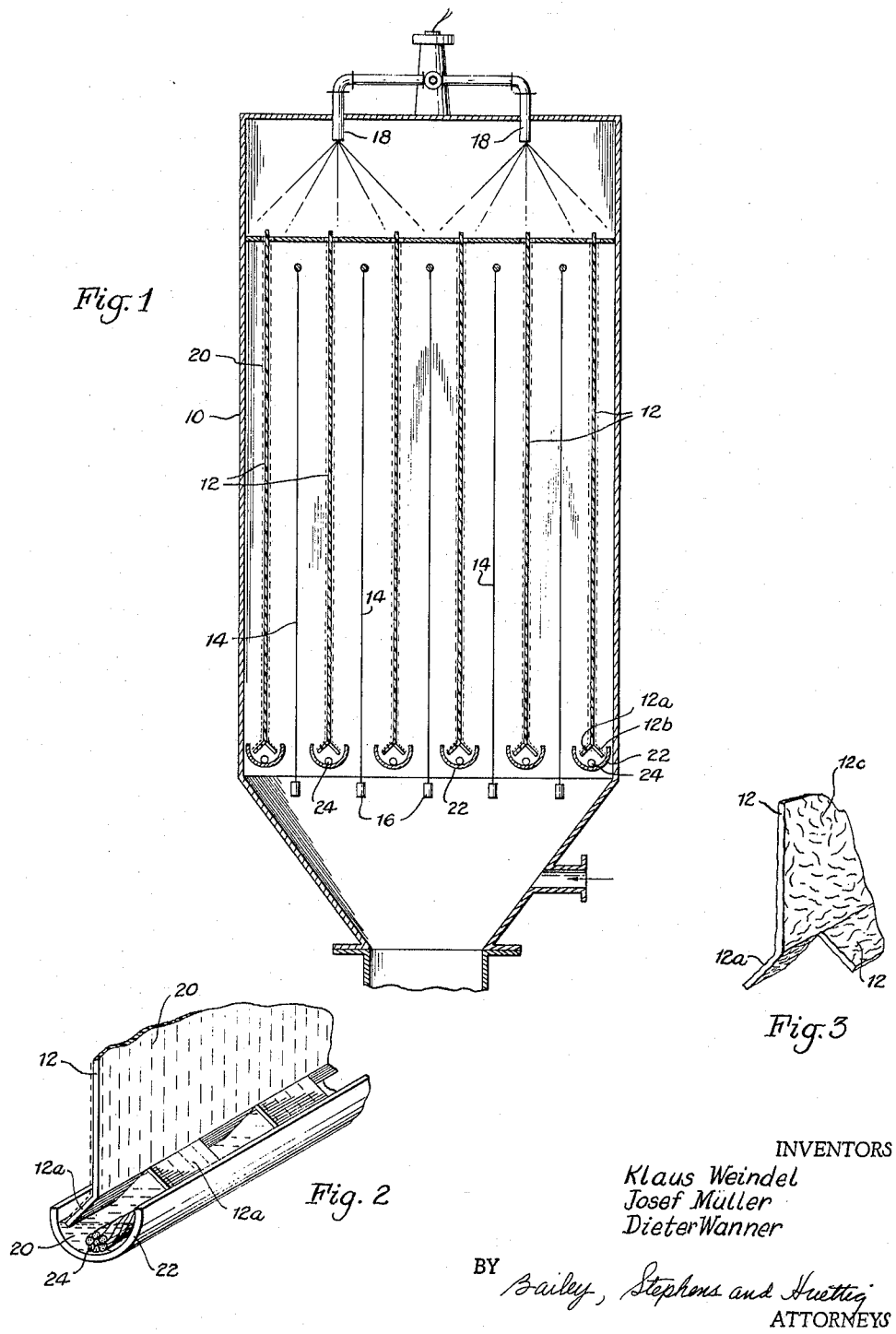

United States Patent Office 3,248,857
Patented May 3, 1966

3,248,857
CHLORINE FILTER
Klaus Weindel, Josef Müller, and Dieter Wanner, Frankfurt, Germany, assignors to Metallgesellschaft Aktiengesellschaft, Frankfurt, Germany
Filed July 9, 1965, Ser. No. 470,768
Claims priority, application Germany, Sept. 27, 1961, M 50,404
6 Claims. (Cl. 55—118)

This is a continuation-in-part of our application Serial No. 225,716, filed September 24, 1962, and now abandoned, for "Chlorine Filter."

This invention relates to the filtering of chlorine gases and especially to an apparatus for the electrical cleaning of chlorine gas or waste gas containing chlorine.

The electrical cleaning of chlorine gases produced in a chlorine-alkaline electrolysis process, such as in the removal of vapor-like impurities from solutions of table salt, by means of a wet electric filter is well known. As disclosed in French Patent No. 1,238,059, the spark electrodes used in the filter are composed of thin wires surfaced with titanium.

In practice, however, it has been found that this technique does not provide a disturbance-free operation of the wet electric filter. This is because the precipitating plates or precipitating tubes are necessarily made of synthetic materials resistant to corrosion, such as polyvinyl chloride, and it is difficult to establish an effective electrical grounding of these electrodes. This is also true for the gutters located beneath the precipitating electrodes for catching the liquid, such as chlorine water mixed with some parts of hydrochloric acid which flows off of the electrodes. Contrary to expectations, it has been found that the chlorine water running off the precipitating electrodes and into the gutter is not sufficiently electrically conductive to establish the electrical grounding.

Although precipitating electrodes made from semiconductive fibrous materials are known, nevertheless such do not teach how a grounding of an electrode composed of electrical insulating material alone can be grounded.

The object of this invention is to produce an apparatus for effectively electrically grounding these electrically insulating and wet precipitating electrodes.

In this invention, it has been found that, insofar as the liquid flowing on and from the precipitating electrodes is concerned, the volume of the precipitated liquid can only be maintained at ground potential if substantially all of the electrically conductive portions of the liquid flowing on and off the precipitating electrodes are additionally and carefully grounded with the aid of electrical grounding means positioned beneath the lower ends of the electrodes. Cords or ropes composed of ceramic material or fiber glass are immersed in the liquid in the gutters beneath the electrodes and absorb the liquid in the nature of wicks and thus form an electrically conductive path which can be electrically connected to a grounding wire.

Another feature of the invention is that the cords or ropes in adjacent gutters are electrically connected together by means of a carbon rod which serves as a bus bar.

Another feature of the invention is that platinum wires are used for joining the cords or ropes to the carbon rod and for ground wires which extend through the sealing box in the wall of the filter housing.

The means by which the objects of the invention are obtained are disclosed more fully with reference to the accompanying drawings in which:

FIGURE 1 is a vertical cross-sectional view through a wet electrical filter using flat plate precipitating electrodes;

FIGURE 2 is a perspective view of the bottom of one of the plate electrodes in FIGURE 1 and the gutter beneath the lower edge thereof;

FIGURE 3 is a perspective view of a plate electrode of FIGURE 1 having a roughened surface;

Figure 4:
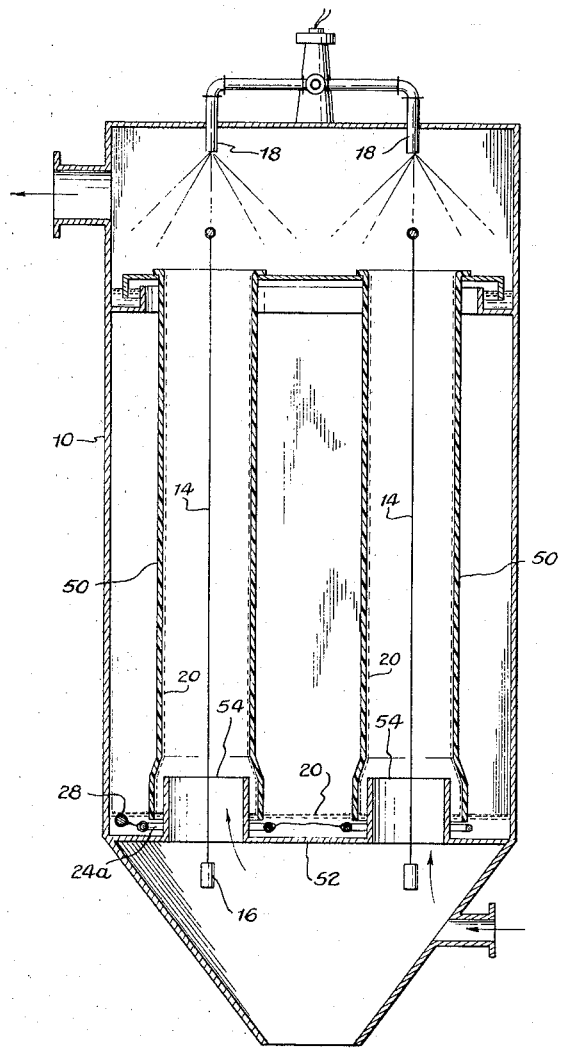
FIGURE 4 is a vertical cross-sectional view of a wet electric filter using tubular precipitating electrodes.

As shown in FIGURE 1, the wet electric filter is composed of the housing 10 in which are mounted spaced flat plate precipitating electrodes 12 formed of a synthetic material resistant to corrosion by chlorine such as polyvinyl chloride. The spark or emitting electrodes 14 are hung between the precipitating electrodes 12 and are kept taut by ceramic weights 16 secured to the lower ends of electrodes 14. The surfaces of the electrodes 12 are wetted by liquid introduced through nozzles 18 at the top of the filter, which liquid 20 flows down the surfaces of the electrodes 12. The lower edges of each electrode 12 have alternately bent flanges 12a. These flanges extend into a gutter 22 composed of a non-corrosive material such as polyvinyl chloride. Mounted in each gutter is a cord or rope 24 composed of a ceramic material or fiber glass. This cord or rope is immersed in the liquid draining off the electrodes 12 into the gutter and absorbs the liquid to form an electrical grounding path. The cords or ropes 24 function as a wick composed of a material which is especially resistant to corrosion by chlorine.

Figure 6:
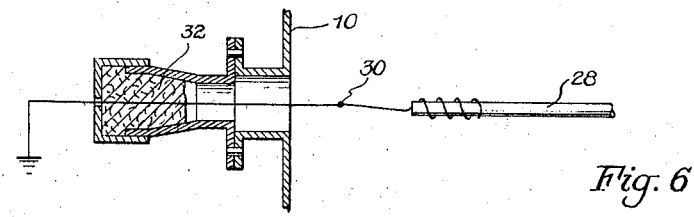
FIGURE 6 is a vertical cross-sectional view through a portion of the filter showing the ground wire extending through the wall of the filter.
Figure 7:
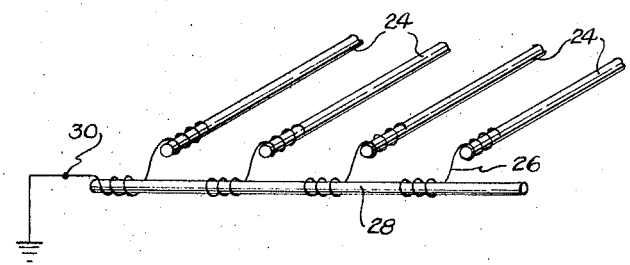
FIGURE 7 is a perspective view showing a plurality of cords or ropes connected to a carbon bus bar for the filter of FIGURE 1.

As shown in FIGURE 7, the cords 24 are connected by platinum wires 26 to a carbon rod bus bar 28. This bus bar is connected by a platinum wire 30 to ground. As shown in FIGURE 6, wire 30 extends through a sealing box 32 in the wall of housing 10 and to ground.

As shown in FIGURE 3, the electrode 12 can have a roughened surface 12c for the purpose of assisting in the distributing of the liquid over the entire surface of the filter.

In operation, liquid 20 emerging from nozzles 18 flows downwardly over the surfaces of electrodes 12 while chlorine containing gas rises vertically between the electrodes 12. This liquid is electrically conductive and drains in a substantially uninterrupted stream into the gutters 22 and covers the cords 24. The electrical charge coming from the titanium wire spark electrodes 14 is conducted by the liquid 20 to the cords 24 and then to the carbon rods 28 which are connected by the wires 30 to ground. Inasmuch as the cords 24, carbon rods 28 and platinum wires 26 and 30 are resistant to corrosion by chlorine, the grounding is effected by the use of two inexpensive materials, namely the cords 24 and rods 28 and by a limited use of the expensive platinum wires 26 and 30.

Figure 5:
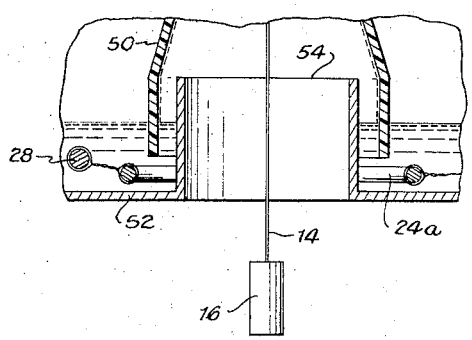
FIGURE 5 is an enlarged detail view of the bottom portion of a precipitating electrode of FIGURE 4 and the collecting gutter.
Figure 8:
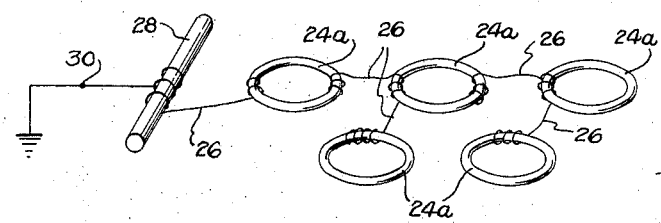
FIGURE 8 is a similar view for the grounding means employed for the tubular filter of FIGURE 4.

In the modification of FIGURES 4, 5 and 8, tubular precipitating electrodes 50 are mounted in the housing 10. The lower end portions of the tubes are enlarged and extend into a liquid collecting gutter 52 having annular flanges 54 which project upwardly into the enlarged lower portions of tubular electrodes 50 leaving a space between each flange 54 and the inner wall of the tube 50. The tubes 50 and gutters 52 are made of the same material as the electrodes 12 and gutters 22 of FIGURE 1. An annular cord 24a surrounds each flange 54 and is immersed in the liquid in the gutter 52 below the lower edge of tubular electrode 50. These annular cords 24a are composed of ceramic material or fiber glass and function as wicks as disclosed for the cords 24 of FIGURE 1. The annular cords are connected to each other by platinum wires 26 and also to the carbon bus bar 28. The bus bar 28 is grounded by the lead 30 as shown in FIGURES 1 and 6.

The liquid 20 introduced through nozzles 18 flows down the inner wall of the tube 50 and into the gutter 52. As in FIGURE 1, this liquid is electrically conductive and is in electrical contact with the cords 24a. Thus again, the tubular electrode 50 is grounded through the medium of the liquid 20, cords 24a, carbon rod 28 and the platinum wires 26 and 30. Again as in FIGURE 1, the inner wall of electrode 50 can have a roughened surface to distribute the liquid.

Another advantage of the invention is in that the cords 24 and 24a are not brittle and therefore will not break when the electrodes are knocked when being cleaned. This is also true with regard to the platinum leads 30 which extend to the housing because the housing also vibrates and would destroy a rigid carbon rod. Therefore, the rods 28 are only used where they are not subject to breakage.

Having now described the means by which the objects of the invention are obtained

We claim:

1. In a wet electric filter for cleaning chlorine gases, said filter having a housing enclosing emitting electrodes composed of titanium and precipitating electrodes composed of a synthetic material, and means for forming an electrically conductive film of liquid on the surface of each precipitating electrode; means for electrically grounding said precipitating electrodes comprising gutters beneath the lower edges of said precipitating electrodes for collecting liquid flowing from the surfaces of said precipitating electrodes, non-metallic wicks corrosion resistant to chlorine in said gutters and immersed in said liquid to be in electrical contact therewith, and leads electrically connected to said wicks and to the ground.

2. In a filter as in claim 1, further comprising carbon bars electrically joined to said wicks and to said leads.

3. In a filter as in claim 1, said leads comprising platinum wires extending through said housing, and insulating means for sealing the passage of said wires through said housing.

4. In a filter as in claim 3, said wicks being composed of ceramic.

5. In a filter as in claim 3, said wicks being composed of fiber glass ropes.

6. In a filter as in claim 3, said precipitating electrodes having roughened surfaces for holding liquid flowing over said surfaces.

References Cited by the Examiner

UNITED STATES PATENTS

| | | | |
|---|---|---|---|
| 1,067,974 | 7/1913 | Cottrell | 55—2 |
| 1,250,088 | 12/1917 | Burns | 55—118 X |
| 1,329,817 | 2/1920 | Walcott | 55—10 X |
| 1,339,480 | 5/1920 | Schmidt | 55—13 |
| 1,342,651 | 6/1920 | Squire | 55—118 |
| 1,357,202 | 10/1920 | Nesbit | 55—154 X |
| 1,766,422 | 6/1930 | Wintermute et al. | 55—12 |
| 1,828,631 | 10/1931 | Whitney | 55—13 |
| 1,828,646 | 10/1931 | Dantsizen | 55—13 |
| 1,951,867 | 3/1934 | Grilli | 55—154 X |
| 2,017,732 | 10/1935 | Russell | 55—360 |
| 2,055,368 | 9/1936 | Shively | 55—7 |
| 2,214,649 | 9/1940 | Allan | 55—13 X |
| 2,231,330 | 2/1941 | Gove | 55—101 X |
| 2,245,516 | 6/1941 | Wintermute | 55—118 |
| 2,357,355 | 9/1944 | Penney | 55—107 |
| 2,508,133 | 5/1950 | Andersen | 55—147 X |
| 2,533,021 | 12/1950 | Krchma | 55—71 |
| 2,571,079 | 10/1951 | Warburton | 55—121 |
| 2,864,458 | 12/1958 | De Graaf et al. | 55—107 |
| 2,937,709 | 5/1960 | De Sevessky | 55—108 X |
| 3,053,028 | 9/1962 | Kayko | 55—131 X |
| 3,062,732 | 11/1962 | Keidel | 55—354 X |

FOREIGN PATENTS

| | | |
|---|---|---|
| 233,011 | 2/1961 | Australia. |
| 70,960 | 3/1959 | France. |
| 1,238,059 | 6/1960 | France. |
| 425,273 | 2/1926 | Germany. |
| 186,047 | 1/1923 | Great Britain. |
| 553,753 | 6/1943 | Great Britain. |
| 709,476 | 5/1954 | Great Britain. |
| 734,207 | 7/1955 | Great Britain. |
| 828,282 | 2/1960 | Great Britain. |

OTHER REFERENCES

German printed application No. 1,001,239, Lechler et al., printed Jan. 24, 1951 (no dwg., 1 pp. spec.).

Lyman, T., editor, Metals Handbook, The American Society for Metals, 7301 Euclid Ave., Cleveland, Ohio, 1948 Edition, p. 1121 (copy in Technical Library).

German printed application No. 1,008,259, Muller, printed Aug. 17, 1954 (1 sht. dwg., 2 pp. spec.).

Perry, John H.: Chemical Engineers Handbook, McGraw-Hill Book Company, Inc., New York, N.Y., Third Edition, 1950, pp. 1461, 1481 (copy in Technical Library).

HARRY B. THORNTON, *Primary Examiner.*